(12) United States Patent
Hansson

(10) Patent No.: US 11,054,048 B2
(45) Date of Patent: Jul. 6, 2021

(54) CHECK VALVE ASSEMBLY

(71) Applicant: ÖHLINS RACING AB, Upplands Väsby (SE)

(72) Inventor: Erik Hansson, Upplands Väsby (SE)

(73) Assignee: ÖHLINS RACING AB, Upplands Väsby (SE)

( * ) Notice: Subject to any disclaimer, the term of this patent is extended or adjusted under 35 U.S.C. 154(b) by 188 days.

(21) Appl. No.: 16/086,749

(22) PCT Filed: Mar. 22, 2017

(86) PCT No.: PCT/EP2017/056861
§ 371 (c)(1),
(2) Date: Sep. 20, 2018

(87) PCT Pub. No.: WO2017/162761
PCT Pub. Date: Sep. 28, 2017

(65) Prior Publication Data
US 2019/0085929 A1      Mar. 21, 2019

(30) Foreign Application Priority Data

Mar. 24, 2016 (EP) .................................... 16162249

(51) Int. Cl.
*F16K 15/00* (2006.01)
*F16K 15/02* (2006.01)
(Continued)

(52) U.S. Cl.
CPC .............. *F16K 15/02* (2013.01); *F16F 9/065* (2013.01); *F16F 9/34* (2013.01); *F16F 9/5126* (2013.01);
(Continued)

(58) Field of Classification Search
CPC .... F16F 9/52; F16F 9/064; F16F 9/065; F16F 9/08; F16F 9/081; F16F 9/082;
(Continued)

(56) References Cited

U.S. PATENT DOCUMENTS

| 4,504,081 A | 3/1985 | Shimizu et al. |
| 2015/0285325 A1* | 10/2015 | Fox ........................... F16F 9/44 |
| | | 188/314 |
| 2017/0175930 A1* | 6/2017 | Wyatt ................. F16K 27/0209 |

FOREIGN PATENT DOCUMENTS

| AU | 2005225145 A1 | 5/2006 |
| DE | 1500163 A1 | 6/1969 |

(Continued)

OTHER PUBLICATIONS

International Search Report for International Application No. PCT/EP2017/056861, dated Jun. 27, 2017 (2 pages).

*Primary Examiner* — Nicholas J Lane
(74) *Attorney, Agent, or Firm* — Kagan Binder, PLLC

(57) ABSTRACT

Check valve assembly (1, 1') for a shock absorber (100) comprising a housing (10). The housing (10) comprises a first volume (11), wherein a pressure P1 prevails; a second volume (12), wherein a pressure P2 prevails; a first housing portion (VE1), and a second housing portion (VE2). The housing (10) further comprises a fluid passage (20) between said first (11) volume and said second (12) volume; and a spool (40), said spool (40) being movably arranged in said housing (10) between at least a first position in which a flow of fluid through said fluid passage (20) between the first (11) and second (12) volume is allowed and at least a second position in which a flow of fluid through said fluid passage (20) between the first (11) and second (12) volume is prevented. The spool (40) comprises a first portion (S1) adapted to engage with said first portion (VE1) of said valve housing 10, forming a first region of engagement (RE1), and
(Continued)

a second portion (S2) adapted to engage with said second portion (VE2) of said valve housing (10), forming a second region of engagement (RE2). Further, the first region of engagement (RE1) is arranged at a first location and said second region (RE2) is arranged at a second location. Also, a shock absorber (100) comprising a working cylinder (C) adapted to receive a working fluid, a piston dividing said cylinder (C) into a first (WC1) and a second (WC2) working chamber and a check valve assembly (1, 1') according to above. Further, a front fork comprising such a check valve assembly (1, 1').

10 Claims, 3 Drawing Sheets

(51) Int. Cl.
*F16F 9/34* (2006.01)
*F16K 15/08* (2006.01)
*F16K 17/04* (2006.01)
*F16F 9/512* (2006.01)
*F16F 9/06* (2006.01)
*F16K 15/12* (2006.01)

(52) U.S. Cl.
CPC ............ *F16K 15/026* (2013.01); *F16K 15/08* (2013.01); *F16K 15/12* (2013.01); *F16K 17/046* (2013.01)

(58) Field of Classification Search
CPC ......... F16F 9/5126; F16F 9/34; F16K 15/186; F16K 15/02; F16K 15/021; F16K 15/025; F16K 15/026; F16K 17/046
See application file for complete search history.

(56) References Cited

FOREIGN PATENT DOCUMENTS

| | | |
|---|---|---|
| DE | 4328571 C1 | 10/1994 |
| FR | 2355210 A1 | 1/1978 |
| WO | 2017162763 A1 | 9/2017 |

\* cited by examiner

CHECK VALVE ASSEMBLY

CROSS-REFERENCE TO RELATED APPLICATIONS

This application claims priority to International Application No. PCT/EP2017/056861, filed Mar. 22, 2017 and titled "CHECK VALVE ASSEMBLY," which in turn claims priority from a European Application having ser. no. 16162249.3, filed Mar. 24, 2016 and titled "CHECK VALVE ASSEMBLY," both of which are incorporated herein by reference in their entireties.

TECHNICAL FIELD

The present specification generally relates to the field of valves for shock absorbers for vehicles and in particularly discloses a check valve assembly, a shock absorber and a front fork comprising such an assembly.

TECHNICAL BACKGROUND

Shock absorbers and damping systems are used for damping of the relative movement between the wheel and the chassis of a vehicle, such as a car, a motorcycle or a bicycle. A conventional shock absorber normally comprises a working cylinder filled with a damping fluid, such as hydraulic oil or gas, and a piston arranged on a piston rod movably arranged in the cylinder. The piston is further commonly arranged to divide the cylinder into a first and second working chamber and moves in the cylinder against the resistance of the fluid, which in turn causes damping fluid to move in the damping cylinder. The damper may be arranged between the vehicle chassis and the wheel to move telescopically as the vehicle travels along such that the movement of the wheel and vehicle is thus damped by the piston moving in the cylinder against the resistance of the fluid. In the specific case of a motorcycle, a bicycle, or a mountain bike, dampers may be arranged in a front fork arrangement and/or between the driver and the rear part of the motorcycle or bicycle, in either case damping impacts and vibrations with respect to the driver.

Further, shock absorbers may comprise means for controlling the damping force exerted due to the flow of fluid through the damper. Such means may include different types of valve arrangement. One common type of valve used in shock absorber is a check valve, i.e. a valve permitting a flow of fluid in one direction.

One known type of check valve commonly used in the art is a so called poppet valve, wherein a valve body lifts from a seat in order to allow a flow of fluid. Other examples include check valves comprising shims, i.e. thin discs arranged in front of fluid ports designed to bend, or flex, to allow flow in one direction. Both poppet valves and valves comprising shims are typically held closed by means of a spring action.

However, in order to allow for the sometimes high flows of fluid present in the shock absorber, a relatively high lifting height may be required for these types of valves. Known problems associated with larger lifting heights in these types of valves include the shim or poppet, when positioned at a relatively large distance from the seat, being detained at this position (i.e. an open stage of the valve) due to the fact that forces generated due to the pressure of the fluid may be too low in such a position to return the shim or poppet to the closed position, i.e. the closed stage of the valve. Accordingly, the check valve may lose its function as a check valve.

Further, problems associated with the moving part sticking to the stationary part of the valve are known for the mentioned valve types. Due to this behaviour of the moving part, unwanted pressure spikes may arise in the shock absorber.

U.S. Pat. No. 4,504,081A discloses a prior art check valve, and AU2005225145A1 discloses a prior art pressure controlled valve system.

SUMMARY OF THE INVENTION

Accordingly, it would be desirable to provide an improved check valve for a shock absorber. In particular, it would be desirable to provide a check valve exhibiting a more stable behaviour, i.e. to provide a reduction of the sensitivity to variations in frequency and flow. To better address one or more of these concerns a check valve assembly, a shock absorber and a front fork as defined in the independent claim is provided. Preferred embodiments are defined in the dependent claims.

According to a first aspect of the invention a check valve assembly for a shock absorber is provided. The check valve assembly comprises a housing, the housing comprising a first volume, wherein a pressure P1 prevails and a second volume, wherein a pressure P2 prevails, a first housing portion VE1, and a second housing portion VE2 and a fluid passage between the first volume and the second volume. The assembly further comprises a spool. The spool is movably arranged in the housing between at least a first position in which a flow of fluid through the fluid passage between the first and second volume is allowed and at least a second position in which a flow of fluid through the fluid passage between the first and second volume is prevented. The spool 40 comprises a first portion S1 adapted to engage with the first portion of the valve housing, forming a first region of engagement and a second portion adapted to engage with the second portion of the valve housing, forming a second region of engagement. The first region of engagement is arranged at a first location and said second region is arranged at a second location.

In one embodiment of the first aspect, the first region of engagement is arranged at a first location and said second region is arranged at a second location, such that a first local state of fluid flow prevailing at the first region of engagement is substantially independent of a second local state of fluid flow prevailing at said second region of engagement.

According to the first aspect, the check valve assembly provides an inventive solution to the concerns described above derived from the realization that the desired characteristics may be provided by a design incorporating a first and a second region of engagement between a spool and a valve housing, wherein the first region of engagement is arranged at a first location and said second region is arranged at a second location. Hereby, i.e. by designing a check valve comprising a spool engaging the valve housing at a plurality of regions, different functionalities of the valve may be performed at different locations, or portions, of the check valve. Therefore, the check valve assembly, i.e. the respective portions of the spool and the valve housing, may be designed in order to provide a specific functionality, hereby reducing the need for less desirable compromise when designing the valve as well as increasing both versatility and adaptability of the valve assembly to for example specific needs of different applications. This is advantageous, for example, in that sensitivity to variations in frequency and flow may be reduced. Accordingly, advantages of the invention include that the valve assembly may exhibit a more stable and reliable behaviour.

The disclosed check valve assembly is suitable for use in any type of shock absorber for vehicles, including shock absorbers for cars, motorcycles, all-terrain vehicles and bicycles such as mountain bikes. More particularly, the check valve assembly may be particularly suitable for a hydraulic shock absorber, for example a shock absorber in which a refill from a high-pressure side to a low-pressure side may take place. During use of the latter type of shock absorber, the working chambers are connected to an additional reservoir, i.e. a reservoir volume which may be utilized for pressurization of the damping fluid, as well as for providing a compensation for the displacement of fluid due to movement of the piston rod. The check valve assembly may for example be arranged to control a flow of fluid between a working chamber of the shock absorber and a reservoir.

Further, the check valve assembly is adapted to control the flow from a first volume and a second volume, wherein a pressure P1 and P2 prevails respectively. Accordingly, in some embodiments, the check valve assembly may be adapted to remove a pressure differential between the first and second volume, i.e. to equalize pressures between a first and a second volume.

The design whereby the first region of engagement is arranged at a first location and the second region is arranged at a second location allows for a freedom of design with regards to many types of properties of the valve. Such properties include, but are not limited to, properties relating to handling and controlling of the fluid flow through the valve as well as properties related to the general behaviour of the valve for example with respect to sensibility to variations in pressure and flow and the like. Accordingly, this design provides possibilities to allow for example for the design of the valve to be locally optimized with regards to the properties in question, hereby reducing the amount of restrictions on the design. In some embodiment, more than two regions of engagement may be present in the check valve assembly.

The check valve assembly may advantageously be adapted to be arranged in a location on a shock absorber chosen in order to make the shock absorber design as volume efficient as possible, while at the same time achieving a satisfactory flow of fluid for example between one or more working chambers and/or an additional reservoir. Depending on the application, the check valve assembly may be adapted to be arranged at a position adjacent to one of the working chambers of such a shock absorber, at a position external from the cylinder and/or at a position separate from the cylinder. In some embodiments, the check valve assembly may comprise additional check valves, for example the check valve assembly may comprise more than one spool. In some embodiments, the assembly may comprise different types of valves adapted to perform different functionalities of the damper depending on the application. Thus, the check valve assembly may be easily adapted to suite different types of shock absorbers.

The first region of engagement may in some embodiment form a partitioning separating said first and second volume, i.e. a partitioning between said first and second volume. In some embodiments, the first region of engagement forms a partitioning permanently separating said first and second volume. Accordingly, the spool may comprise a first area of engagement adapted to provide a permanent separation between the first and second volume, while at the same time being movably arranged in said housing including a position in which a flow of fluid through said fluid passage between the first and second volume is allowed. This is particularly advantageous in that a region of engagement is provided between the spool and the valve housing separated from any local phenomena which are known to arise in fluid passages, such as flow turbulence and similar other types of interference. According to one embodiment, the first region of engagement forms a partitioning at least partly separating said first and second volume.

According to one embodiment, the first region of engagement comprises a substantially fluid tight seal. Accordingly, the first region of engagement provides a substantially fluid tight seal between the first and the second volume. In some embodiments, the fluid tight seal forms part of the partitioning separating said first and second volume. By substantially fluid tight should be understood a seal preventing at least a flow of fluid sufficient to influence the behaviour of the valve, i.e. what the skilled person would recognize as a significant flow of fluid in the valve. In a practical case, minute flows (i.e. leakage) may in some embodiments be present at the first area of engagement. Accordingly, the first area of engagement may comprise a suitable engagement in order to provide for such a fluid tight seal, examples include an overlapping engagement or other suitable structural designs. In some embodiments, the engagement may comprise additional sealing means, for example gaskets, in order to provide the sealing engagement. Due to the movable arrangement of the spool, one example of a suitable engagement is a sliding engagement between the first housing portion and the first portion of the spool.

According to one embodiment, the second region of engagement RE2 is a region of engagement forming an adjustable fluid opening of the fluid passage. Examples include any type of engagement formed between the first housing portion and the first portion of the spool such as a sliding engagement and/or an overlapping engagement whereby the size of the opening is determined by the relative sliding distance and/or the degree of overlap. The adjustable fluid opening allows for an adjustable fluid flow from the first volume to the second volume, in some embodiments the fluid opening and hence the fluid flow may be continuously adjusted. In other embodiments, the fluid opening and hence the fluid flow may be adjusted in a step-wise manner, i.e. by means of predetermined steps. Accordingly, according to one embodiment, the second region of engagement comprises an engagement between said first spool portion and said first housing portion adapted to control the size of said adjustable fluid opening of the fluid passage.

According to one embodiment, the first region of engagement RE1 is a region of engagement forming an engagement adapted to control the position of the spool. The spool is movably arranged between a first position wherein a flow of fluid is allowed through said fluid passage and a second position wherein a flow of fluid is prevented. According to one embodiment, the first region of engagement comprises means adapted to influence the spool and/or to induce such a movement to the spool, i.e. to for example push or pull the spool into said first and/or second position. Examples of such means include a surface exposed to an internal and/or external force, such as a force induced by the first and/or second pressures prevailing in the first and second volume.

In some embodiments, the first and second regions of engagement RE1, RE2 may be physically separated. Further, in some embodiment, the check valve assembly may comprise separating means comprising a first and a second side, wherein said first region of engagement RE1 is arranged on said first side and said second region of engagement RE2 is arranged on said second side. Examples of such separating means include a barrier, a partitioning a separating wall or similar.

One particularly advantageous effect of the first region of engagement RE1 being arranged at a first location and the second region of engagement RE2 being arranged at a second location, associated with an embodiment of the check valve assembly wherein the first region of engagement RE1 is adapted to control the position of the spool 40 is that the area, or region, RE1 adapted to control the position and hence in many cases the general behaviour of the valve, may be isolated from any other areas of engagement, or interaction, such as the adjustable fluid channel opening. Accordingly, any disturbances for example related to turbulent flow and local variations of pressure at the region of fluid flow, for example the fluid passage 20 opening, may be avoided at the first region of engagement RE1 controlling the position of the spool 40. Hereby a stable and predictable behaviour of the check valve 1 may be achieved. Such an effect may be further enhanced in the embodiments mentioned above wherein the first and second regions of engagement RE1, RE2 are physically separated and/or wherein the assembly 1 comprises separating means.

According to one embodiment, the first portion S1 of said spool comprises a first side S1$a$ and a second side S1$b$, wherein the first side S1$a$ is exposed to the pressure P1 and the second side S1$b$ is exposed to pressure P2. Accordingly, a pressure differential between pressures P1 and P2 may be defined over the first portion of the spool. Accordingly, in some embodiment, the spool 40 may be described as forming a barrier, or a partition, between the first 11 and second 12 volumes at the first region of engagement RE1.

According to one embodiment, the first side is exposed to the pressure P1 and the second side is exposed to pressure P2 such that a pressure differential between pressures P1 and P2 governs the position of the spool with respect to said housing. For example, the spool may be arranged such that an increase of the pressure P2 causes the spool to move in a first direction whereas an increase of the pressure P1 causes the spool to move in a second direction. The second direction may be a direction opposite to the first direction. In such an embodiment, the size of the adjustable opening of the fluid passage may be determined by the balance of forces due to pressures P1 and P2 over the first portion S1 of the spool.

In one embodiment, at least one of said first and second sides S1$a$, S1$b$ of the first portion S1 of the spool, is adapted to, possibly selectively, engage a corresponding surface of said valve housing. One example of such a corresponding surface is a surface extending substantially parallel to the at least one of said first and second side S1$a$, S1$b$. In one embodiment, the at least one of said first and second side S1$a$, S1$b$, is adapted to engage the corresponding surface of said valve housing by means of a movement along a normal direction of the at least one of said first and second sides S1$a$, S1$b$.

In one embodiment, the at least one of said first and second side S1$a$, S1$b$, is adapted to engage the corresponding surface of said valve housing such that a movement whereby the at least one of said first and second sides S1$a$, S1$b$ lifts from said corresponding surface is allowed. In one embodiment, at least one of said first and second side S1$a$, S1$b$ lifts from the corresponding surface of the valve housing as the spool moves from the second position to the first position, i.e. when the spool moves to allow a flow of fluid.

Accordingly, in some embodiment, the movement of the spool may be described as governed by the pressure differential over the first portion S1 of the spool, whereby the pressure P1 may act on the first side and the pressure P2 may act on the second side of the first portion S1 of the spool, such that the spool may for example move away from a corresponding surface of the valve housing as the pressure P1 becomes larger than the pressure P2 and move towards the corresponding surface should the pressure P2 becomes larger than the pressure P1. Such a movement may be a movement along a direction substantially parallel to the normal direction of the first and second side of the first housing portion of the spool.

According to one embodiment, at least one of said first and second sides S1$a$, S1$b$ is adapted to engage the corresponding surface along a first portion of the area of the at least one of said first and second side S1$a$, S1$b$ In one embodiment, the at least one of said first and second sides S1$a$, S1$b$ comprises a recess, or cut-out, such that the at least one of said first and second side S1$a$, S1$b$ may engage the corresponding surface of the valve housing along a first portion of the area of the at least one of said first and second side S1$a$, S1$b$, whereas a clearance may prevail between the at least one of said first S1$a$ and second S1$b$ side and the corresponding surface, said clearance being defined by said recess, or cut-out. Such a clearance may for example prevail between the remaining portion of the at least one of said first and second side S1$a$, S1$b$ and the corresponding surface.

Accordingly, in the exemplary case described above wherein the spool 40 may move away from the corresponding surface of the valve housing as the pressure P1 becomes larger than the pressure P2 and move towards the corresponding surface should the pressure P2 become larger than the pressure P1, the described recess or cut-out may be arranged on the described first surface (on which pressure P1 acts). Hereby, the recess or cut-out, allows for pressure P1 to act on the first surface also when the spool is arranged in the second position. Hence, the opening of the valve by means of the movement of the spool back to the first position is facilitated by means of the recess allowing access to the pressure P1 to act on the first surface also when the spool is arranged in the second position corresponding to a position wherein flow of fluid through the fluid passage is prevented.

In one embodiment, the corresponding surface of the valve housing comprises a recess, or cut-out, such that the at least one of said first and second side S1$a$, S1$b$ may engage the corresponding surface of the valve housing along a first portion of the area of the at least one of said first and second side S1$a$, S1$b$, whereas a clearance may prevail between the at least one of said first and second side S1$a$, S1$b$ and the corresponding surface, said clearance being defined by said recess, or cut-out.

The skilled person realizes an equivalent effect may be achieved by at least one of the first and second side S1$a$, S1$b$ and/or the corresponding surface of the valve housing comprising a protruding structure forming a portion of the at least one of the first and second side S1$a$, S1$b$ and/or the corresponding surface of the valve housing.

In some embodiments, a similar effect, may be achieved by a first and a second spring being arranged to act on the first and second side of the first portion of the spool, such that at a state of equilibrium between said first and second spring, the spool is arranged at a position wherein a space, or clearance prevails, between the at least one of the first and second side and the corresponding surface of the valve housing such that the pressure P1 may act on the at least one of the first and second side also when the spool i arranged in sad second position wherein a flow of fluid is substantially prevented through the fluid passage 20.

The design of the spool may be adapted to different needs for example with regards to the size of the areas on which pressures P1 and P2 act which may preferably be chosen sufficiently large in order to generate forces capable of controlling the mass of the spool for example at high levels of acceleration. This may be especially advantageous with regards to the large fluid flows which are often required to be handled by check valves of shock absorbers since a sufficiently large area, and hence a sufficiently large force, allows for large flows to be handled in an efficient way. This stands in contrast to valves known in the art such as poppet valves and shimmed valves where problems relating to the effect of the pressure differential over the valve being lost when large flows require large lifting heights and the valve is controlled solely by spring forces, which need to be high in order to manage high frequency movement. Such valves hence tend to exhibit a less desirable behaviour where the pressure drop over the valve is strongly dependent on the amount of flow through the valve. Further, during rapid shifts in flow conventional check valves are known to remain open when situated in a position remote from the seat due to the forces generated by the pressure differential being too small during such conditions. The forces on the check valve of the present specification remain constant regardless of the position of the spool.

According to one embodiment, the spool including the shape and size of the surfaces exposed to pressures P1 and P1 is designed such that the resulting force due to pressures P1 and P2 may increase more than the mass of the spool as the spool is made larger.

According to one embodiment, the spool comprises a shape comprising a first and a second side, which may be described as an inner and an outer side, wherein the first side is exposed to the pressure P1 and the second side is exposed to pressure P2. According to one embodiment, the spool comprises a hollow shape comprising a first and a second side, which may be described as an inner and an outer side, wherein the first side is exposed to the pressure P1 and the second side is exposed to pressure P2. According to one embodiment, the spool comprises the shape of a hollow cylinder.

According to one embodiment, the first portion of the spool comprises a flange, wherein said flange comprises a first and a second side FS1$a$, FS1$b$, wherein the first side is exposed to the pressure P1 and the second side is exposed to pressure P2. In one embodiment, at least one of the first and second sides of the flange comprises a recess, or cut-out.

According to one embodiment, the second portion of the spool comprises a first surface adapted to engage a first surface of the second housing portion by means of an overlapping engagement. For example, the first surface of the spool may be arranged to slide along a corresponding portion of the first surface of the valve housing such that an overlap is achieved.

According to one embodiment, the first surface of the second portion of the spool engages the first surface of the second valve housing portion by means of an overlap when the spool is arranged in the second position, such that a flow of fluid though the fluid passage is prevented. In some embodiments, the overlap is achieved by means of a sliding engagement between the first surfaces of the second portion of the valve housing and the spool respectively. In some embodiments, a flow of fluid is allowed when the first surface of the second portion of the spool and the first surface of the second valve housing portion moves out of engagement. Such an engagement is advantageous for example in that proper sealing may be facilitated by means of the overlapping engagement. Further, known problems of valves utilizing a lifting movement of a valve body in order to open the valve relating to adhesion during opening may be significantly reduced. Such adhesion, or sticking, is associated with spikes in pressure.

Closing of the valve may also be facilitated by means of the overlapping engagement providing a type of cutting, or shearing of the fluid flow when closing he valve in contrast to known valves whereby fluid has to be pushed away during closing.

In one embodiment, the length, or size, of the overlap when the spool is arranged in the second position lies in the range 0-2 mm, sometimes in the range 0.2-1.5 mm. By length, or size, may be understood a maximum achievable overlap.

According to one embodiment, the second portion of the spool may comprise a first surface adapted to engage a first surface of the second valve housing portion by means of an overlapping engagement, such that a variable overlap is achieved along the area of contact formed between the engaging surfaces. In one exemplary embodiment, the variable overlap may be achieved when the spool is arranged in said second position.

In one embodiment, the variable overlap may be achieved by means of the first surface of the spool comprising a defined portion such that a comparably smaller overlap is achieved along the area of contact at said defined portion. In other words, the overlap over a short portion of the area of contact, along said defined portion, may be arranged to be very short, or small, compared to the overlap prevailing over the remaining portion of the area of contact.

In one embodiment, the portion may be achieved by means of a recess, notch, cut-out or similar arranged at, or in, the first surface of the spool. In one embodiment, the recess, notch, cut-out or similar may be arranged at a circumference at a first end of the spool.

In one embodiment, the length, or size, of the comparably smaller overlap at said defined portion when the spool is arranged in the second position lies in the range 0-0.2 mm.

Such embodiments are advantageous in that a small flow of fluid may be allowed before the first surface of the second portion of the spool moves completely out of engagement with the first surface of the second valve housing portion, i.e. before the valve opens, by means of a region/regions along the area of contact comprising a smaller overlap. Hereby a softer opening behaviour of the valve may be achieved. Further, hysteresis effects may be reduced.

Accordingly, the spool and/or the valve housing may be designed such that an overlap between the first surface of the spool and the first surface of the second valve housing portion may be, for example when the spool is arranged in the second position, sufficiently large over a large portion of the total area of overlap, or area of contact, such that a proper level of sealing is achieved while at the same time allowing for a small area of very little overlap. This small area of small, or short, overlap may be made sufficiently small not to induce behaviour of the valve which would be characterized as a leaking behaviour, and still have a surprisingly large effect on the opening/closing-behaviour of the valve.

According to one embodiment, the pressure P1 is a pressure acting in a direction pushing the spool into said first position and the pressure P2 is a pressure acting in a direction pushing the spool into said second position. Accordingly, the pressure P1 may be a pressure acting such that the fluid passage between the first and second volume is open, i.e. opening the valve, and the pressure P2 may be a pressure acting to close the valve. According to one embodiment, the position of the spool 40 is controlled solely based on the pressure differential between P1 and P2. This position may be described as a position relative the housing 10 of the valve 1.

According to one embodiment, the check valve assembly 1 further comprises a spring 50 arranged to bias said spool 40 in a direction D. Such a spring 50 may be advantageous for example in that a more stable behaviour of the spool 40 may be achieved due to the spring 50 biasing force preventing the spool 40 from being affected, for example moving, due to small fluctuations in pressure. A further advantage is that such a spring 50 may be utilized to position the spool 40 in a desired initial position. The stiffness of the spring 50 may be chosen depending on the application.

According to one embodiment, the direction D is a direction such that the opening of the fluid passage 20 is held closed. Accordingly, in such an embodiment, the spring bias may be described as defining an opening pressure, or a threshold, which may have to be exceeded, in some embodiments by the pressure P1, before the spool 40 moves to a position wherein a flow of fluid is allowed, i.e. an open stage of the check valve assembly 1. Further, such an arrangement may in some embodiments be advantageous in that the spring 50 may push the spool 40 into the second position, i.e. a closed stage of the valve assembly 1, before the actual pressure differential between the first 11 and second 12 volumes is equal to zero.

According to one embodiment, the second region of engagement RE2 is a region of engagement arranged at a position upstream of the fluid passage 20 with respect to the first region of engagement RE1. In some embodiments, the second region of engagement RE2 may however be arranged downstream of the first region of engagement RE1.

According to a second aspect of the invention, a shock absorber 100 comprising a working cylinder C adapted to receive a working fluid, a piston P dividing said cylinder C into a first WC1 and a second WC2 working chamber and a check valve assembly 1, 1' according to any of the embodiments described above is provided.

According to one embodiment, the check valve assembly 1, 1' of such a shock absorber 100 may be adapted to control a flow of working fluid, i.e. a damping medium flow in the shock absorber 100. In one embodiment, the damping medium flows may be a damping medium flow adapted to flow between the two working chambers WC1, WC2. The damping medium flow may be arranged such that the flow is directed through flow ducts (not shown) in the piston P and/or the piston rod. In some embodiments, however the damping medium flow may be arranged to flow through flow through ducts in which the check valve assembly 1, 1' according to what has been described above has been arranged.

According to one embodiment, the check valve assembly 1, 1' may be arranged outside of the cylinder C. This allows for easy access to the check valve assembly 1, 1', as well as for a compact layout for the shock absorber 100 wherein for example the diameter of the cylinder C may be kept smaller. In one embodiment, the check valve assembly 1, 1' may be arranged at an upper end of the shock absorber 100, i.e. at an end opposite to that of the piston rod.

According to one embodiment, the shock absorber 100 further comprises an additional reservoir R, wherein P1 may be a pressure of said reservoir R and wherein P2 may be pressure of one of said working chambers WC1, WC2. Accordingly, in some embodiments, the damping medium flow may be a damping medium flow adapted to flow between at least one of the first WC1 and second WC2 working chambers and an additional reservoir R. An additional reservoir R is advantageous for pressurization of the damping fluid, as well as for providing a compensation for the displacement of fluid due to movement of the piston rod. Such reservoirs R are well known in the art and will hence not be described in further detail.

According to one embodiment, the shock absorber 100 further comprises a reservoir R such that said first volume 11 may be fluidly connected to the reservoir and the second volume 12 may be fluidly connected to at least one of said first WC1 and second WC2 working chamber.

According to one embodiment, the shock absorber 100 comprises at least a first check valve assembly 1 adapted to control a first flow of fluid between a first working chamber WC1 and an additional reservoir R, and a second check valve assembly 1' adapted to control a second flow of fluid between a second working chamber WC2 and an additional reservoir R.

According to one embodiment, the shock absorber 100 further comprises a second check valve assembly 1, wherein the pressure P2 prevailing in a second volume of the first check valve assembly 1 is a pressure P2 of the first working chamber WC1, and the pressure P2' prevailing in a second volume of the second check valve assembly 1' is a pressure P2' of the second working chamber WC2. In some embodiment, the first check valve assembly 1 may be adapted to control a flow between the first working chamber WC1 and an additional reservoir R. The second check valve assembly WC2 may be adapted to control a flow between the second working chamber WC2 and an additional reservoir R.

Objectives, advantages and features of the shock absorber 100 conceivable within the scope of the second aspect of the invention are readily understood by the foregoing discussion referring to the first aspect of the invention.

According to another aspect of the invention, a front fork for a vehicle comprising a check valve assembly 1, 1' according to any of the embodiments described above is provided. Some embodiments may relate to a front fork for a bicycle or mountain bike comprising a check valve assembly 1, 1' according to any of the embodiments described above. In some embodiment, such a front fork may comprise a first and a second check valve assembly 1, 1', the first check valve assembly 1' may be arranged at a first end of the front fork and the second check valve assembly may be arranged at a second end of the front fork. Again, objectives, advantages and features of the front fork conceivable within the scope of this aspect of the invention are readily understood by the foregoing discussion referring to the first- and second aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

SHORT DESCRIPTION OF THE APPENDED DRAWINGS

The invention will be better understood through the following illustrative and non-limiting detailed description of preferred embodiments, with reference to the appended drawing, on which:

All figures are schematic, not necessarily to scale, and generally only show parts which are necessary in order to elucidate the invention, wherein other parts may be omitted or merely suggested. Throughout the figures the same reference signs designate the same, or essentially the same features.

DETAILED DESCRIPTION OF PREFERRED EMBODIMENT OF THE INVENTION

Figure 1A:
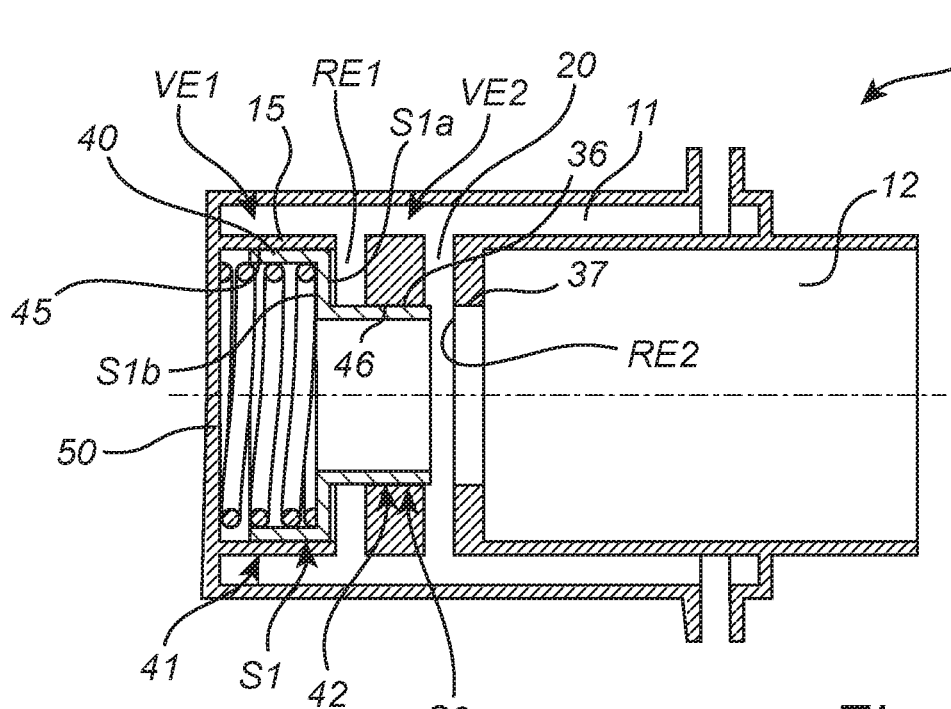
FIG. 1a is a schematic illustration of an embodiment of the check valve assembly 1, shown in a stage wherein the fluid passage 20 is open.
Figure 1B:
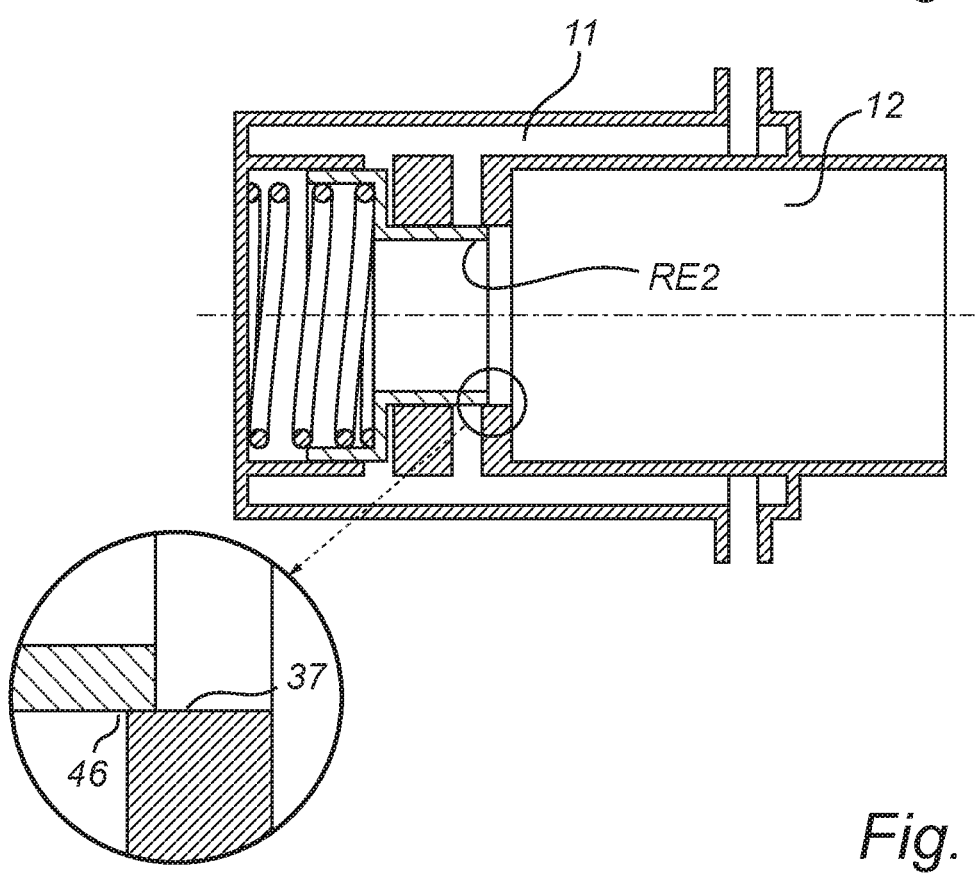
FIG. 1b is a schematic illustration of an embodiment of the check valve assembly 1, shown in a stage wherein the fluid passage 20 is closed.

FIGS. 1a and 1b show a check valve assembly 1 according to one embodiment. The check valve assembly 1 comprises a housing 10 comprising a first volume 11 and a second volume 12. A pressure P1 prevails in the first volume 11 and a pressure P2 prevails in the second volume 12. A fluid passage 20 is arranged between the first 11 and the second 12 volumes. The housing 10 further comprises a first housing portion VE1 and a second housing portion VE2.

The check valve assembly further comprises a spool 40. In the illustrated embodiment, the spool 40 has a hollow, substantially cylindrical shape, wherein a first portion 41 of the spool 40 comprises a larger diameter than a second portion 42 of the spool. The spool 40 is further movably arranged in the housing 10 between at least a first position in which a flow of fluid through said fluid passage 20 between the first 11 and second 12 volumes is allowed (shown in FIG. 1a) and at least a second position in which a flow of fluid through said fluid passage 20 between the first 11 and second 12 volume is prevented (shown in FIG. 1b). The engagement between the spool 40 and the housing 10 is a sliding engagement, wherein the surface 45, 46 slide along the corresponding surfaces 15, 36.

The spool 40 further comprises a first portion S1 and a second portion S2. The first portion S1 of the spool 40 is adapted to engage with the first portion of the valve housing 10, forming a first region of engagement RE1, and the second portion S2 of the spool 40 is adapted to engage with the second portion VE2 of the valve housing 10, forming a second region of engagement RE2.

With regards to the first region of engagement RE1, forming an engagement adapted to control the position of the spool 40, the first portion S1 of the spool 40 comprises a surface 43 adapted to engage the valve housing 10. With regards to the second area of engagement RE2, forming an adjustable fluid passage 20 opening, the second portion S2 of the spool 40 comprises a surface 46 adapted to slide along the surface 36 of the valve housing 10 and/or to form an overlapping engagement with surface 37 of the valve housing 10.

A spring 50 is arranged to bias the spool 40 in a direction pushing the spool 40 into a position wherein flow of fluid through the fluid passage 20 is prevented. The spring 50 is arranged substantially within the first portion 41 of the spool 40 and bears against a wall of the housing 10.

The functionality of the check valve assembly 1 will now be described with reference to FIGS. 1a and 1b. As described above, a pressure P1 prevails in the first volume 11 and a pressure P2 prevails in the second volume 12. In the exemplary embodiment, schematically illustrated in FIGS. 1a and 1b, the second volume 12 may for example be fluidly connected to a working chamber WC1 of a shock absorber and the first volume 11 may for example be fluidly connected to an additional reservoir R arranged for pressurization of the damping fluid, and/or for providing a compensation for the displacement of fluid due to movement of a piston rod. Accordingly, pressure P1 may correspond to a pressure of the reservoir R and pressure P2 may correspond to the pressure prevailing in the working chamber WC1.

The fluid flow through the fluid passage 20 arranged between the first 11 and the second 12 volumes is controlled by means of the spool 40. This functionality is provided by means of a distribution of functionalities of the spool 40, realized by the described design wherein the first region of engagement RE1 is arranged at a first location and the second region of engagement RE2 is arranged at a second location, of which the first region RE1 is adapted to control the position of the spool 40 based on the pressure differential between first 11 and second 12 volumes whereas the second region RE2 is adapted to control the size of the opening of the fluid passage 20 between the first 11 and second 12 volume.

The control of the position of the spool 40 is provided by means of the first portion of the spool 40 comprising a first S1a and a second S1b side, wherein the first side S1a is exposed to the pressure P1 and the second side S1b is exposed to pressure P2 such that a pressure differential between pressures P1 governs the position of the spool. In the illustrated case, side S1a corresponds, or coincides, with surface 43 mentioned above.

Accordingly, pressures P1, P2 act on sides S1a, S1b respectively such that the position of the spool 40 is controlled by the resulting force balance over the spool 40, more particularly over the flange comprising first S1a and second S1b sides. In order to allow for pressure P1 to act on surface/side S1a also at a stage when the check valve 1 is closed as illustrated in FIG. 1b, the flange, i.e. first side S1a, further comprises a recess, or cut-out 38.

The control of the fluid passage 20 opening on the other hand is provided by means of the second portion S2 of the spool 40 comprising a surface 46 adapted to slide along the surface 36 of the valve housing 10 and/or to form an overlapping engagement with surface 37 of the valve housing 10, shown in detail in FIG. 1b. When the spool 40 is positioned such that a flow of fluid though the fluid passage 20 is prevented (shown in FIG. 1b), the surfaces 46 and 37 are adapted to overlap, i.e. to form an overlapping engagement. In the closed position, this overlap is approximately equal to 0.2-2 mm.

FIG. 1a shows the valve when pressure P1 is larger than P2, i.e. in an open position or a position wherein a flow of fluid is allowed from the first volume 11 to the second volume 12. However, due to the biasing force $F_s$ of spring 50 pushing spool 40 into a closed position, the relationship $P1>(P2+F_s)$ must be fulfilled in order for the spool 40 to be pushed into an open position, i.e. for the valve to open. FIG. 1b shows the check valve assembly 1 when pressure P2 is larger than P1, i.e. in a closed position or a position wherein a flow of fluid from the first volume 11 to the second volume 12 is prevented. The surfaces 46 and 37 overlap in order to form a seal between volumes 11 and 12.

Hence, depending on the pressure levels P1 and P2, the spool 40 moves between the open and the closed position, such that a pressure equalization between volumes 11 and 12 may take place.

Figure 2:
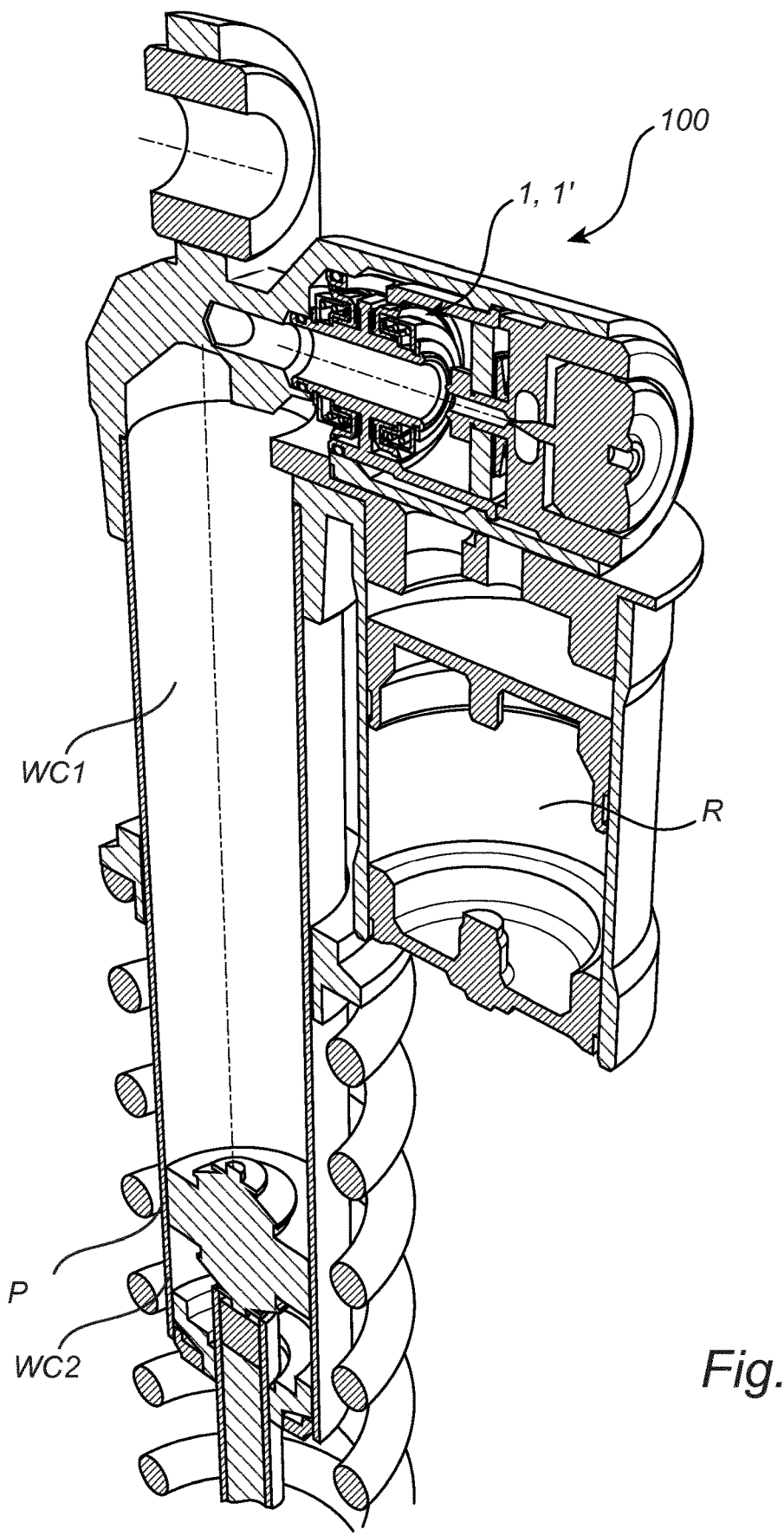
FIG. 2 shows a shock absorber comprising a check valve assembly 1 according to one embodiment.

FIG. 2 shows a shock absorber 100 according to the second aspect. The shock absorber 100 comprises a cylinder C adapted to receive a working fluid, the cylinder being divided by a piston P into two working chambers WC1, WC2 and a check valve assembly 1 according to any of the embodiments described in the present specification. The shock absorber 100 further comprises an additional reservoir R, wherein a pressure P1 prevails, such that the damping fluid may be pressurized. Further, a pressure P2 prevails in at least one of the working chambers WC1, WC2.

The illustrated embodiment of the shock absorber 100 comprises a first and a second check valve assembly 1, 1', arranged to control a flow of fluid between the additional reservoir R and the first working chamber WC1 and between the reservoir R and the second working chamber WC2 respectively. The first and second check valve assembly 1, 1' are arranged at an upper end of the shock absorber 100, on top of the additional reservoir R.

Figure 3:
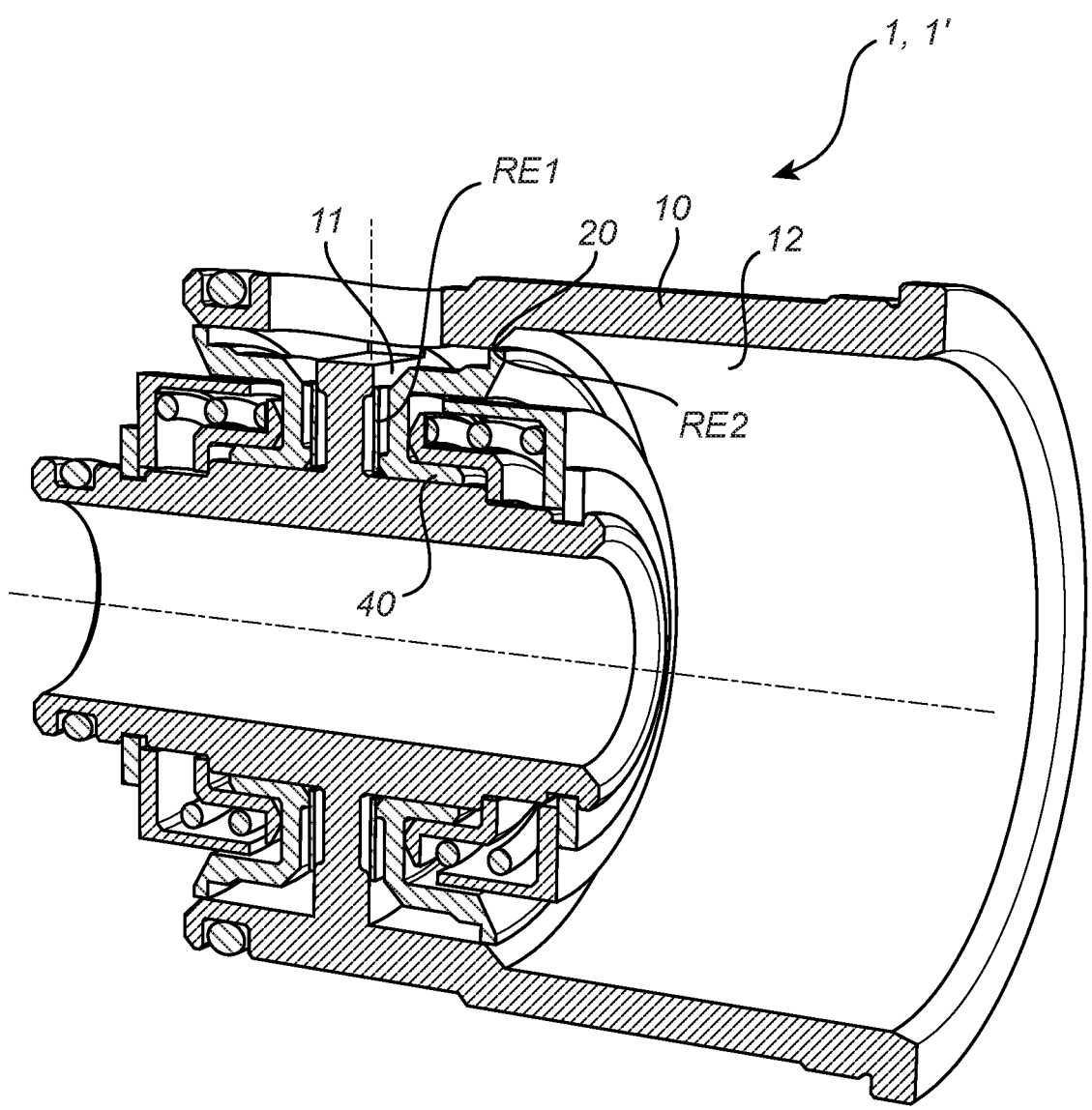
FIG. 3 is a cross sectional view of an embodiment of the check valve assembly 1.

FIG. 3 shows the first and second check valve 1, 1' in detail. As described with reference to the schematic representation of FIGS. 1a and b, each check valve assembly 1, 1' comprises a housing 10 comprising a first volume 11 and a second volume 12. A pressure P1 prevails in the first volume 11 and a pressure P2 prevails in the second volume 12. A fluid passage 20 is arranged between the first 11 and the second 12 volumes. The housing 10 of the check valves 1, 1' further comprises a first housing portion VE1 and a second housing portion VE2.

The check valve assembly 1 further comprises a spool 40. In the illustrated embodiment, the spool 40 comprises an annular shape comprising what may be described as an inner and an outer flange. The spool 40 is further movably arranged in the housing 10 between at least a first position in which a flow of fluid through said fluid passage 20 between the first 11 and second 12 volumes is allowed and at least a second position in which a flow of fluid through said fluid passage 20 between the first 11 and second 12 volumes is prevented as illustrated for example in FIGS. 1a and 1b. The engagement between the spool 40 and the housing 10 is a sliding engagement.

The spool further comprises a first portion and a second portion. The first portion of the spool 40 is adapted to engage with the first portion of the valve housing 10, forming a first region/area of engagement RE1, and the second portion of the spool 40 is adapted to engage with the second portion of the valve housing 10, forming a second region of engagement RE2.

With regards to the first area of engagement RE1, forming an engagement adapted to control the position of the spool 40, the first portion of the spool 40 comprises a surface adapted to engage the valve housing 10. With regards to the second area of engagement RE2, forming an adjustable fluid passage 20 opening, the second portion of the spool 40 comprises a surface adapted to slide along a corresponding surface of the valve housing 10 and/or to form an overlapping engagement with a corresponding surface of the valve housing 10.

A spring 50 is arranged to bias the spool 40 in a direction pushing the spool 40 into a position wherein flow of fluid through the fluid passage 20 is prevented. The spring 50 may also be advantageous in that the spring 50 may push the spool 40 into the second position, i.e. a closed stage of the valve assembly 1, before the actual pressure differential between the first 11 and second 12 volumes is equal to zero, i.e. the valve 1 closes before the piston comes to a complete stop.

As described above, a pressure P1 prevails in the reservoir R and in the illustrated case hence in the first volume 11 and a pressure P2 prevails in a first working chamber WC1 of the cylinder and in the illustrated case hence in the second volume 12. The fluid flow through the fluid passage 20 arranged between the first and the second volume 11, 12 is controlled by means of the spool 40. This functionality is provided by means of the distribution of functionalities of the spool 40, realized by the described design wherein the first region of engagement RE1 is arranged at a first location and the second region of engagement RE2 is arranged at a second location, of which the first region RE1 is adapted to control the position of the spool 40 based on the pressure differential between volumes 11 and 12 whereas the second region RE2 is adapted to control the size of the opening of the fluid passage 20 between the first 11 and second 12 volumes. Depending on the pressure levels P1 and P2, the spool 40 moves between the open and the closed positions, such that a pressure equalization between volumes 11 and 12 takes place, and consequently in the illustrated embodiment a flow of fluid is allowed between the working chamber WC1 fluidly connected to volume 12 and the additional reservoir R fluidly connected to volume 11.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A check valve assembly (1, 1') for a shock absorber (100) comprising
   a housing (10), said housing (10) comprising
      a first volume (11), wherein a pressure P1 prevails,
      a second volume (12), wherein a pressure P2 prevails,
      a fluid passage (20) between said first (11) volume and said second (12) volume; and
   a spool (40), wherein the spool (40) has a hollow shape comprising a cylindrical first portion (41) having a larger diameter than a cylindrical second portion (42) of the spool (40),
   said spool (40) being movably arranged in said housing (10) between at least a first position in which a flow of fluid through said fluid passage (20) between the first (11) and second (12) volume is allowed and at least a second position in which a cylindrical outer surface of the cylindrical second portion (42) of the spool (40) blocks the passage (20), thereby preventing a flow of fluid through said fluid passage (20) between the first (11) and second (12) volume;
   wherein the cylindrical first portion (41) of the spool (40) is adapted to slidably engage with a first portion (VE1) of said valve housing 10, forming a first region of sealing engagement (RE1), and the cylindrical second portion (42) of the spool (40) is adapted to slidably engage with said a second portion (VE2) of said valve housing (10), forming a second region of sealing engagement (RE2);

wherein said first region of engagement (RE1) is arranged at a first location and said second region (RE2) is arranged at a second location, and wherein said first (RE1) and second (RE2) regions of engagement are physically separated by a mid-portion of the spool (40) extending radially between the cylindrical first portion (41) and the cylindrical second portion (42), wherein a first side (s1a) of said mid-portion is exposed to the pressure P1 in the first volume (11) such that the pressure P1 is enabled to act on the mid-portion to force the spool (40) towards the first position.

2. A check valve assembly (1, 1') according to claim 1, further comprising separating means comprising a first and a second side, wherein said first region of engagement (RE1) is arranged on said first side and said second region of engagement (RE2) is arranged on said second side.

3. A check valve assembly (1, 1') according to claim 1, wherein a second side (s1b) of said mid-portion is exposed to the pressure P2 in the second volume (12) such that the pressure P2 is enabled to act on the mid-portion to force the spool (40) towards the second position.

4. A check valve assembly (1, 1') according to claim 1, wherein the second portion (42) of the spool (40) comprises a first surface adapted to engage a first surface of the second portion (VE2) of the housing by means of an overlapping engagement.

5. A check valve assembly according to claim 4, wherein the second portion (42) comprises a first surface adapted to engage a first surface of the second valve housing portion by means of an overlapping engagement, such that a variable overlap is achieved along the area of contact formed between the engaging surfaces.

6. A check valve assembly (1, 1') according to claim 4, wherein said first surface of the second portion (42) of the spool (40) and said first surface of the second valve housing portion (VE2) overlap when the spool (40) is positioned in the second position, such that a flow of fluid though the fluid passage (20) is prevented.

7. A check valve assembly (1, 1') according to claim 1, further comprising a spring (50) arranged to bias said spool (40) towards the second position in a direction (D).

8. A shock absorber (100) comprising a working cylinder (C) adapted to receive a working fluid, a piston dividing said cylinder (C) into a first (WC1) and a second (WC2) working chamber and a check valve assembly (1, 1') according to claim 1.

9. A shock absorber (100) according to claim 8, further comprising a reservoir (R), wherein said first volume (11) is fluidly connected to said reservoir (R) and said second volume (12) is fluidly connected to at least one of said first (WC1) and second (WC2) working chamber.

10. A front fork comprising a check valve assembly (1, 1') according to claim 1.

* * * * *

UNITED STATES PATENT AND TRADEMARK OFFICE
CERTIFICATE OF CORRECTION

PATENT NO. : 11,054,048 B2
APPLICATION NO. : 16/086749
DATED : July 6, 2021
INVENTOR(S) : Erik Hansson It is certified that error appears in the above-identified patent and that said Letters Patent is hereby corrected as shown below:

In the Claims

Claim 1, Line 2, of Column 15 "adapted to slidably engage with said a second portion" should be
-- adapted to slidably engage with a second portion --

Signed and Sealed this
Nineteenth Day of July, 2022

Katherine Kelly Vidal
*Director of the United States Patent and Trademark Office*